US008620885B1

(12) United States Patent
Gupta et al.

(10) Patent No.: US 8,620,885 B1
(45) Date of Patent: Dec. 31, 2013

(54) SYSTEMS, METHODS AND SOFTWARE FOR ADJUSTING READ DATA FROM UTILITY METERS

(75) Inventors: Anil Kumar Gupta, Eden Prairie, MN (US); David James Hubbard, Chaska, MN (US); Jerome Frank Winzig, Minneapolis, MN (US)

(73) Assignee: Ecologic Analytics, LLC, Bloomington, MN (US)

( * ) Notice: Subject to any disclaimer, the term of this patent is extended or adjusted under 35 U.S.C. 154(b) by 842 days.

(21) Appl. No.: 12/706,041

(22) Filed: Feb. 16, 2010

Related U.S. Application Data

(60) Provisional application No. 61/207,738, filed on Feb. 13, 2009.

(51) Int. Cl.
*G06F 17/00* (2006.01)
(52) U.S. Cl.
USPC ........................... 707/697; 707/758; 707/769
(58) Field of Classification Search
USPC ......... 707/697, 758, 769; 340/870.02, 870.03
See application file for complete search history.

(56) References Cited

U.S. PATENT DOCUMENTS

| | | | | |
|---|---|---|---|---|
| 6,088,659 | A * | 7/2000 | Kelley et al. | 340/870.02 |
| 6,333,975 | B1 * | 12/2001 | Brunn et al. | 379/106.03 |
| 6,671,636 | B2 * | 12/2003 | Dawson | 702/62 |
| 6,819,098 | B2 * | 11/2004 | Villicana et al. | 340/870.02 |
| 6,885,309 | B1 * | 4/2005 | Van Heteren | 340/870.11 |
| 7,309,979 | B2 * | 12/2007 | Angerame et al. | 324/103 R |
| 7,734,952 | B1 * | 6/2010 | Hoffman et al. | 714/10 |
| 8,010,640 | B2 * | 8/2011 | Aune et al. | 709/222 |
| 2005/0234837 | A1 * | 10/2005 | Ramachandran et al. | 340/870.02 |
| 2008/0074284 | A1 * | 3/2008 | Edwards et al. | 340/870.02 |

* cited by examiner

*Primary Examiner* — Baoquoc N To
*Assistant Examiner* — Andalib Lodhi
(74) *Attorney, Agent, or Firm* — Schwegman Lundberg & Woessner, P.A.

(57) ABSTRACT

Many public utilities companies employ meter data management systems (MDMSs) to manage the millions and sometimes billions of daily and interval meter read values that they collect during a single billing period. One problem with some MDMSs estimate missing daily reads based on average daily usage and these estimates do not match daily usage values determined from interval read data, causing sum check exceptions. Such exceptions are undesirable because they can lead to billing errors and lost consumer confidence in the utility, among other things. To address this, the present inventors devised an exemplary system that uses good and estimated interval read data to more accurately estimate the missing daily reads and thereby reduce occurrences of sum check exceptions. The exemplary system also estimates missing time of use and demand data based on interval read data.

24 Claims, 4 Drawing Sheets

SYSTEMS, METHODS AND SOFTWARE FOR ADJUSTING READ DATA FROM UTILITY METERS

RELATED APPLICATION

The present application claims priority to U.S. Provisional Patent Application 61/207,738, which was filed on Feb. 13, 2009, and which is incorporated herein by reference in its entirety. Additionally, co-pending and co-owned U.S. patent application Ser. No. 12/496,224, which was filed on Jul. 1, 2009 and which is a continuation of U.S. patent application Ser. No. 11/059,089 filed on Feb. 7, 2005 (now U.S. Pat. No. 7,557,729) is also incorporated herein by reference in its entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2009-2010, Ecologic Analytics, LLC.

TECHNICAL FIELD

Various embodiments of the present invention concern meter data management systems (MDMSs), particularly methods of handling missing or inaccurate meter read data.

BACKGROUND

Electric utility companies regularly collect usage data from meters. Over the last few decades, many public utilities have modernized their data collection using automated meter reading to reduce the time and expense of collecting this data. More recently, utilities have responded to the dynamic pricing of electricity by shifting from once-a-month meter readings to daily, hourly or even sub-hourly meter readings. The daily readings are called register, anchor, or check reads, and the hourly and sub-hourly readings, which frequently report cumulative usage rather than readings on the meter, are called interval reads.

This shift in meter reading frequency is conceptually simple. However, for larger utilities with millions of customers, implementing the shift has been and continues to be an intensely complex undertaking as they transition their business processes and supporting computer infrastructure from handling millions of monthly reads per month to potentially handling billions per month. The amount of data is staggering and the opportunities for making mistakes in gathering it accurately and reliably, even with the most advanced wired and wireless automated meter reading technologies, is equally staggering. One need only consider the problems of signal quality and dropped calls in using mobile telephones, for example, to understand that even the best and most reliable meter data collection systems inevitably suffer from missing or inaccurate reads.

To facilitate the management of this fantastic amount of data, many utilities are now using meter data management systems (MDMSs). One of the leading providers of such systems is Ecologic Analytics, LLC of Bloomington, Minn., the employer of the present inventors.

One problem recognized by the present inventors is that some MDMSs estimate missing register reads using past average daily usage (ADU) values that are derived from past daily (register) reads. Although this estimation procedure is often effective in allowing estimation of the daily register read and daily usage value, it also frequently results in failures of a test known as a sum check because the daily usage estimate based on past ADU does not always match the actual usage that can be determined from good interval reads for the same day. When the difference between these two usage values for the same period of time differs by more than a certain allowable amount, this condition is deemed a sum check exception.

Sum checks are frequently required by public utility commissions to ensure that bills based on automated reads, that is, reads collected without on-site human readings, are accurate. The commissions may monitor check sum exceptions and/or require utility companies to investigate and resolve each of them. Thus, utilities incur expense for every sum check exception and these expenses ultimately diminish the savings from using automated meter readings and may even diminish utility satisfaction and confidence in the MDMS.

Accordingly, the present inventors have recognized a need for new ways of improving the reliability and accuracy of estimated usage data and reducing sum check exceptions.

SUMMARY

To address this and/or other needs, the present inventors devised, among other things, meter data management systems, methods, and software that reduce sum check exceptions by using interval read data not just for checking the accuracy of values derived from daily (register, anchor, or check) read data but for determining or estimating both missing daily and missing interval read data. Using interval data in the estimation process also makes it possible to derive missing time-of-use (TOU) reads and to calculate missing demand reads. One exemplary system detects missing daily and/or interval reads between good daily reads, allocates unaccounted-for usage across the missing intervals, and re-calculates prior estimated daily reads using both good and estimated intervals. In addition, if an ending daily read is missing for a day and there is a complete set of interval reads for the day, the exemplary system calculates the ending daily read.

DETAILED DESCRIPTION OF THE EXEMPLARY EMBODIMENT(S)

This document, which incorporates the drawings and the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Utility Meter Data Processing System

Figure 1:
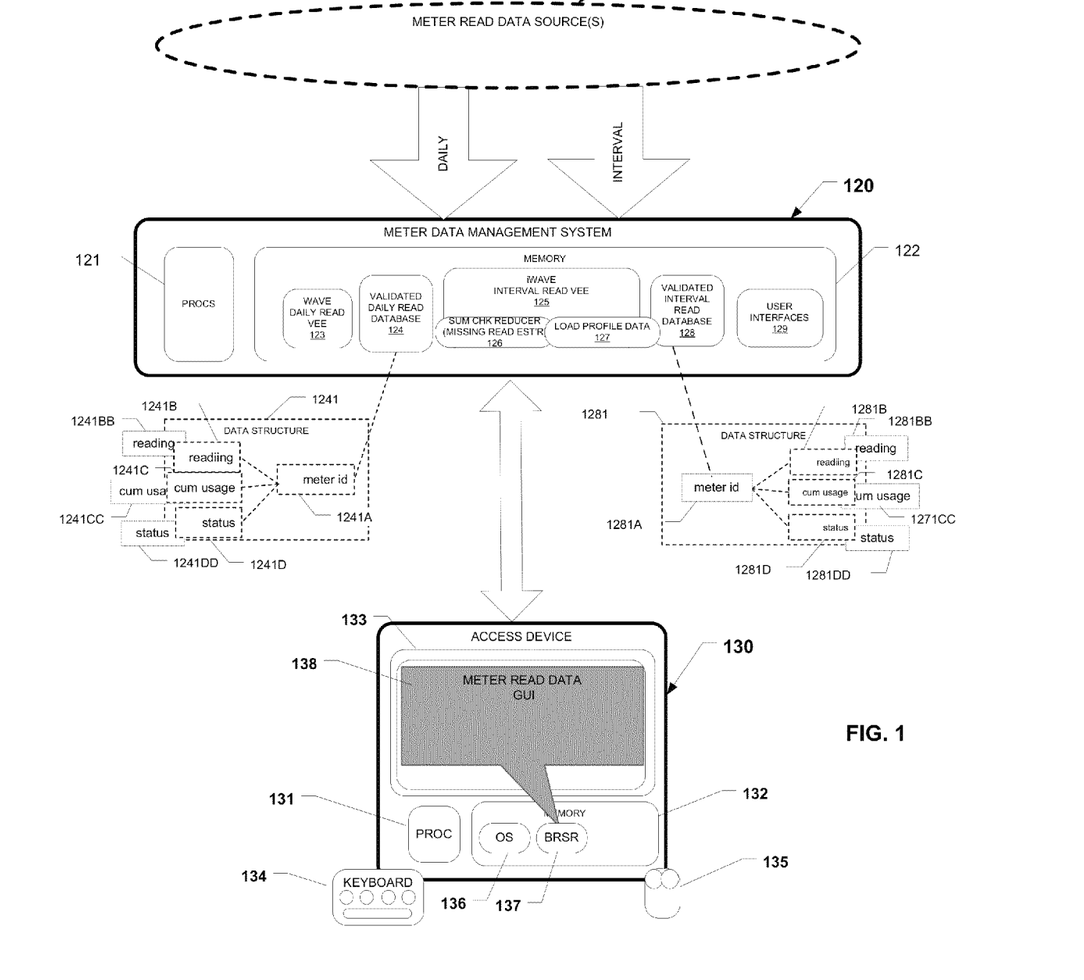
FIG. 1 is a block diagram of an exemplary meter data management system corresponding to one or more embodiments of the present invention.

FIG. 1 shows a block diagram of a utility meter data processing system 100. System 100 includes a set of meter read data sources 110, a meter data management system (MDMS) 120, and one or more access devices 130.

Exemplary Meter Read Data Sources

Meter read data sources 110 include one or more meters or AMR (automated meter reading) headend data servers for one or more types of meters and/or AMR systems. Exemplary systems include systems made or sold by DCSI, Hexagram, Cellnet, Silver Spring Networks (SSN), and Landis+Gyr. Data sources 110 are coupled or couplable via a wireless or wireline communications network, to provide, on a daily basis, raw register (daily, anchor, or check) and interval meter read data to MDMS 120.

Exemplary Meter Data Management System

MDMS 120, which provides meter data management functionality, includes a processor module 121, a memory module 122, a WAVE™ daily read validation, editing, and estimation (VEE) module 123, a validated daily read database module 124, an iWAVE™ interval read VEE module, a-sum check reducer module 126, a load-profile data module 127, a validated interval read database module 128, and a user interface module 129. (WAVE™ and iWAVE™ are trademarks of Ecologic Analytics, LLC of Bloomington, Minn.)

The exemplary embodiment is implemented as one or more SQL database servers and application servers. Exemplary requirements for the database server are as follows:

| Database Server Requirements | |
| --- | --- |
| Requirement | Version |
| Operating System | UNIX-based OS certified with Oracle 10gR2 (IBM AIX 5.2, 5.3, 6.1; Sun Solaris 10; SuSe Linux 10 ES) |
| Database Server | Oracle RDBMS 10g Release 2 (10.2.0.4) NLS_CHARACTERSET: AL32UTF8 NLS_NCHAR_CHARACTERSET: AL16UTF16 |

Additionally, in this embodiment, ORACLE™ database server version 10.2.0.4.0 includes the following patches, which are available from Oracle Corporation of Redwood Shores, Calif.:

| Oracle Database Server Patches | |
| --- | --- |
| Patch Number | Description |
| 6810189 | 10.2.0.4.0 Patch Set For Oracle Database Server |
| 6880880 | Universal Installer: Patch: Opatch 10.2 |
| 8576156 | Database Psu 10.2.0.4.1 (Includes Cpujuly2009) |
| 5231155 | Ora-00600 [Kcbgtcr_1] Error During Insert While Using Error Logging Table |

| Oracle Database Server Patches | |
| --- | --- |
| Patch Number | Description |
| 8318020 | Incorrect Cardinality Estimate For Query That Spans Two Or More Partitions |
| 7512227 | Wrong Result For Query With Outer Joins And Binds |
| 6396242 | Array Index Outof Bound Exception Using Batching With 11.1 Driver |

The application server in the exemplary embodiment meets the following requirements:

| Application Server Requirements | |
| --- | --- |
| Requirement | Version |
| Operating System | UNIX-based OS certified with Oracle WebLogic Server 10.0 (IBM AIX 5.2, 5.3, 6.1; Sun Solaris 10; SuSe Linux 10 ES) UNIX-based OS certified with IBM WebSphere 6.1 (IBM AIX 5.2, 5.3, 6.1; Sun Solaris 10; SuSe Linux 10 ES) |
| Application Server | Oracle WebLogic Server 10.0 with MP1 IBM WebSphere Application Server 6.1 |
| JRE | 32-bit or 64-bit: IBM SDK 5.0 SR2 or higher; Sun JRE 1.5.0_11 or higher |

Processor module 121 includes one or more local or distributed processors, controllers, or virtual machines. In the exemplary embodiment, processor module 121 assumes any convenient or desirable form. In some embodiments, one or more of the processors are incorporated into servers.

Memory module 122, which takes the exemplary form of one or more electronic, magnetic, or optical data-storage devices, stores WAVE™ daily read VEE module 123; validated iWAVE™ interval read VEE module 125, validated interval read data module 128, and user-interface module 129.

In the exemplary embodiment, daily read VEE module 123 (sometimes referred to herein as WAVE™ module) includes one or more sets of machine-readable and/or executable instructions for receiving and performing VEE (validation, estimating, and editing) processing of daily meter read data from one or more of meter read data sources 110. The exemplary VEE processing is performed according to rules and procedures, such as those described in U.S. Pat. No. 7,557,729, which is incorporated herein by reference. Results of this processing—validated, editing, and/or estimated daily meter read data—is stored in validated daily read database module 124.

In the exemplary embodiment, the validated daily read database module includes machine-executable instructions for commercially available SQL database functionality and one or more data structures, of which data structure 1241 is representative. Data structure 1241 includes a unique meter identification portion 1241A, which is logically associated with one or more fields, such as fields 1241B, 1241C, and 1241D. Field 1241B includes a current meter read value; field 1241C includes a current cumulative usage value based difference of the prior meter read value and the current meter read value; and field 1241D includes a status label indicating whether the current meter read value is a good read value direct as provided by the meter read data source, whether the meter read value was missing from the current daily meter data, or whether it was estimated and if estimated by what method it was estimated. The exemplary embodiment uses the flag or label IAR (which stands for Interval Adjusted Read) to indicate a daily (register, anchor or check) read (or related value) that has been estimated based on interval read data.

In addition, the exemplary embodiment maintains one or more version data fields 1241BB, 1241CC, and 1241DD, for each of the respective data fields 1241B, 1241C, and 1241D. These version fields, which are automatically created with any update of a current data field, are accessible through SQL queries and graphical user interfaces, as described below.

Interval read VEE module 125 (sometimes referred to herein as iWAVE module) includes one or more sets of machine-readable and/or executable instructions for receiving and performing VEE processing on interval read data from meter read data sources 110. Exemplary interval meter reads include 5, 10, 15, 30, and 60 minute interval reads. In the exemplary embodiment, module 125 includes sum check reducer module 126 and load profile data module 127.

Sum check reducer module 126 includes one or more sets of machine-readable and/or executable instructions for reducing the occurrences of check-sum exceptions that might otherwise occur due to mismatches between usage values calculated using estimates of daily read data and usage values calculated using interval read data. In the exemplary embodiment, this reduction process (sometimes referred to herein as "IAR-ing") entails identifying missing intervals between two good daily reads, allocating unaccounted-for usage across the missing intervals, and re-calculating any daily reads that were previously estimated. If load profile data for a particular customer (or meter) is available, the exemplary embodiment allocates the usage across missing intervals proportionately based on load profile data for time periods corresponding to the missing intervals. (In the exemplary embodiment, the term Auto Reference Shape (ARS) estimation, is sometimes used to refer to the general process of using load profile data to estimate read or usage data.) If load profile data is unavailable, the unaccounted-for usage is allocated equally across the missing intervals.

Load profile data module 127 includes estimating a customer's hourly (or subhourly) electric usage based upon patterns of past usage. The exemplary embodiment stores the load profiles of each customer for prior days, weeks, and billing periods in the form of load profile templates, which show actual usage date for hourly or sub-hourly intervals for various periods. In addition, templates showing usage patterns for similar customers that vary by customer rate schedules or profiles can be loaded annually from data provided by the utility company. Profile eligible schedules can include: Residential, Small commercial & AG customers (below 50 KW of demand), and Streetlights & Traffic Control. Dynamic load profiles that use load research data collected daily by the utility company for similar customers can also be loaded every day.

Validated interval read database module 128 includes results output from interval data VEE module 125 and sum check reducer module 126, using data from load profile data module 127. In the exemplary embodiment, the validated interval read data module includes machine-executable instructions for commercially available SQL database functionality and one or more data structures, of which data structure 1281 is representative. Data structure 1281 includes a unique meter identification field 1281A, which is logically associated with one or more fields, such as fields 1281B, 1281C, and 1281D. Field 1281B includes a current interval meter read value; field 1241C includes a current cumulative usage value based on difference of the prior interval meter read value and the current interval meter read value; and field 1241D includes a status label indicating whether the current interval meter read value is a good interval read value provided by the meter read data source, whether the meter read value was missing from the current daily meter data, or whether it was estimated and if estimated by what method it was estimated.

The exemplary embodiment includes one or more of the following labels which indicate estimates based on Auto Reference Shape (ARS), or load profile data:

Same Day Estimation (SDY): Estimation based on prior data for the same day of the week on which the missing interval occurred, unless the missing interval occurred on a holiday, in which case data for prior holidays is used.

Like Day Estimation (LDY): Estimation based on prior data for like days (e.g., weekdays versus weekends) on which the missing interval occurred. Daytypes can be defined by rate and are not limited to Monday-Friday for weekdays and Saturday-Sunday for weekends.

Dynamic Load Profile Estimation (DYN): Estimation based on the utility's dynamic load profile data for the customer class. Typically, the utility calculates and provides this dynamic load profile data every few days.

Static Load Profile Estimation (STA): Estimation based on the utility's static load profile data for the customer class. Typically, the utility calculates and provides this static load profile data on an annual basis.

Interval Flat Line Estimation (IFL): If no load profile data is available, the utility may elect to estimate intervals on a flat-line basis, allocating usage equally to each missing interval.

In addition, the exemplary embodiment maintains one or more version data fields 1271BB, 1271CC, and 1271DD, for each of the respective data fields 1271B, 1271C, and 1271D. These version fields, which are automatically created with any update of a current data field, are accessible through SQL queries and graphical user interfaces, as described below.

User-interface module 129 includes machine readable and/or executable instruction sets for wholly or partly defining web-based or browser-compatible user interfaces, such utility AMR (automated meter reading) navigation interfaces, over a wireless or wireline communications network on one or more accesses devices, such as access device 130.

Exemplary Access Device

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from MDMS 120 to implement the interfaces shown or described elsewhere in this description.)

Exemplary Method(s) of Operation

Figure 2:
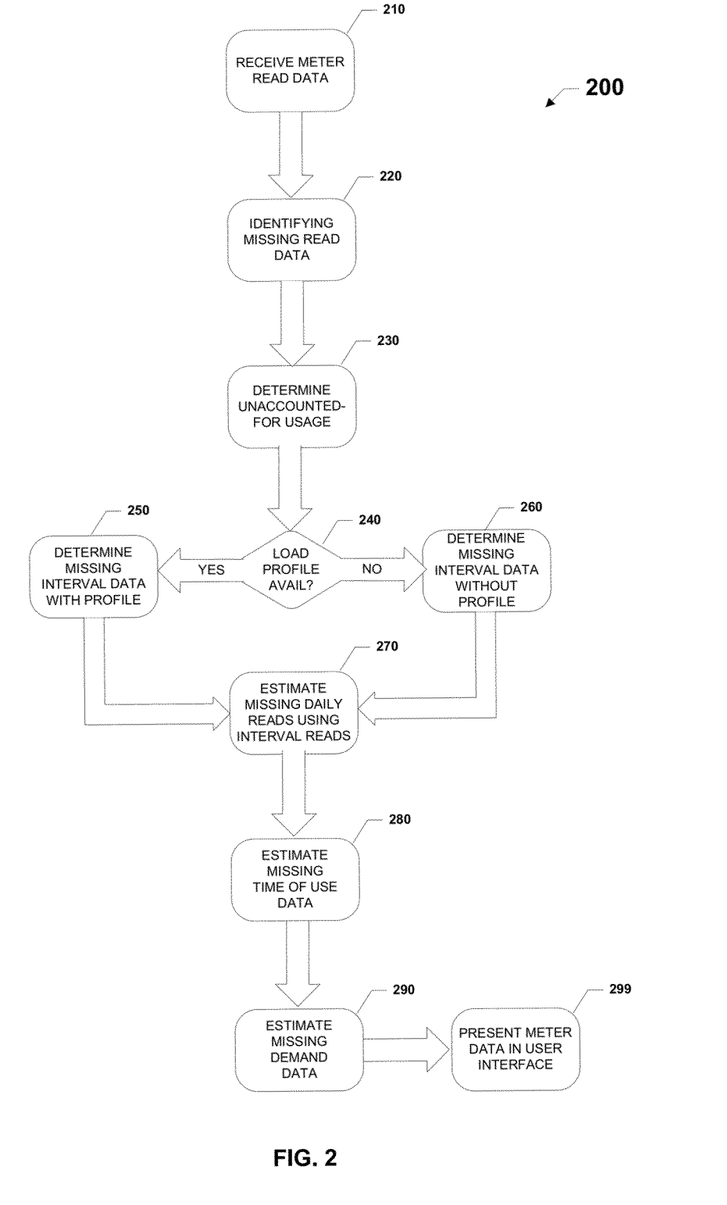
FIG. 2 is a flow chart of an exemplary method of operating a meter data management system, corresponding to one or more embodiments of the present invention.

FIG. 2 shows a flow chart 200 of one or more exemplary methods of operating a system, such as system 100. Flow chart 200 includes blocks 210-299, which are arranged and described in a serial execution sequence in the exemplary embodiment. However, other embodiments execute two or more blocks in parallel using multiple processors or processor-like devices or a single processor organized as two or more virtual machines or sub processors. Other embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

At block 210, the exemplary method begins with MDMS 120 receiving daily and interval read data as separate data streams from meter read data sources 110. In the exemplary embodiment, separate headend AMR servers for the daily and for the interval data communicate with gateway infrastructure (not shown) within MDMS 120. The data received in block 210 has been processed to include placeholder records for missing daily reads and interval reads, estimated missing daily reads based on historical average daily usage (ADU) data, and estimated missing intervals based on the ADU-estimated daily reads and load profile data. (As noted in the background, daily and interval read estimates based on ADU data are likely to give rise to sum check exceptions.) Exemplary execution continues at block 220.

Block 220 entails identifying missing interval read data in a set of meter read data. In the exemplary embodiment, this entails identifying missing interval read data between two good register (daily) reads. Once the missing interval read data between the two good register reads is identified, execution continues at block 230.

In block 230, the exemplary embodiment determines an amount of unaccounted-for usage represented by the missing interval reads. In the exemplary embodiment, this determination is based on the two good register reads and the existing interval read data. The difference between the two good register reads constitutes the known usage for the time period in question. When the usage indicated by any existing good interval reads for the time period are subtracted, the remaining unaccounted usage can then be allocated to any missing intervals for the same time period, allocating that usage using load profile data. Execution continues at block 240.

Block 240 entails determining whether there is load profile data available for the given meter or meter location. If there is load profile data available, execution branches to block 250, and if there is no load profile data available, execution branches to block 260.

In block 250, the exemplary embodiment uses load profile data to apportion unallocated usage proportionately across all missing intervals between the two good register reads. The exemplary embodiment allocates proportionately according one of four Auto Reference Shape (ARS) or load profile methods:

Same Day Estimation (SDY): Estimation based on prior data for the same day of the week on which the missing interval occurred, unless the missing interval occurred on a holiday, in which case data for prior holidays is used.

Like Day Estimation (LDY): Estimation based on prior data for like days (e.g., weekdays versus weekends) on which the missing interval occurred. Daytypes can be defined by rate and are not limited to Monday-Friday for weekdays and Saturday-Sunday for weekends.

Dynamic Load Profile Estimation (DYN): Estimation based on the utility's dynamic load profile data for the customer class. Typically, the utility calculates and provides this dynamic load profile data every few days.

Static Load Profile Estimation (STA): Estimation based on the utility's static load profile data for the customer class. Typically, the utility calculates and provides this static load profile data on an annual basis.

Configuration parameters that apply to the meter's headend system (gateway) and rate determine how many of the four methods are used, and in what sequence when data for any given method is not available. Each of the missing intervals, or more precisely their corresponding fields in the MDMS interval database, is updated with the determined value and its status is updated with the appropriate SDY, LDY, DYN, or STA label to indicate which method was used to estimate it. Version data for the interval reads is also updated.

When this interval adjustment process is applied in the exemplary embodiment, it re-estimates any estimated interval reads that were based on estimated register (daily) reads and estimated daily usage that were derived from past ADU data. In the exemplary embodiment, this change allows all unallocated usage to be apportioned proportionately across all missing intervals whenever the data being adjusted based on interval data includes a consecutive missing intervals time period that is greater than the "Auto Point-to-Point Linear Interpolation Threshold in Hours" parameter. Any period of consecutive missing intervals that is less than this parameter are apportioned using unallocated usage and an estimation rule of "Auto Straight Line" (ASL); this rule, also known as auto point-to-point linear interpolation, results in a smooth allocation of usage across a small number of missing intervals.

In block 260, where load profile data is unavailable, the exemplary execution entails allocating the unaccounted-for usage equally across the missing intervals. In the exemplary embodiment, this process is governed using an "Interval Flat Line Estimation" (ISL) parameter with a default value of "1". If no load profile (reference shape) data is available and this parameter is set to "1", the exemplary embodiment apportions unallocated usage equally across all missing intervals between the two good register reads. These interval reads are tagged or assigned an Estimation Rule Acronym of IFL (for Interval Flat Line) in the Estimation Rule (or status) field to indicate this associated interval was estimated using a flat line allocation method as part of the IAR process. The IFL label distinguishes associated interval reads from interval reads estimated using the four types of Auto Reference Shape (ARS) or load profile estimation rules (SDY, LDY, DYN, or STA). (If no load profile data is available and the "Interval Flat Line Estimation" parameter is set to "0" by the client utility configuration, then the missing intervals that are computed based on the unallocated usage are not used to re-estimate any prior estimated register reads in block 270.)

As in block 250, each of the missing intervals, or more precisely their corresponding fields in the MDMS interval database is updated with the determined value and its status is updated with the appropriate IFL (Interval Flat Line) label to indicate it was estimated using the interval flat-line interpolation method. Version data for these interval reads is also updated. Execution continues at block 270.

Block 270 entails estimating or re-estimating any missing or previously estimated register reads that are between the two good register reads using the now completed set of interval reads that are between them. Since usage has been allocated for every hour or other appropriate interval throughout the day, estimated usage can be calculated for each day between the two good register reads, and each missing register read can be derived from this estimated daily usage. When the exemplary embodiment replaces WAVE-estimated (estimates based on average-daily usage (ADU)) register reads with those based on interval reads (good and/or estimated), they are labeled or tagged as "IAR" (Interval Adjusted Register reads) in the database (specifically in the estimation rule or status field for the register read.).

The exemplary embodiment also includes a utility definable parameter, Adjust Estimation Flag, with a default value of "1". If this parameter is set to "1" and interval reads are stored in pulses rather than kWh, the IAR process adjusts one or more IAR-estimated intervals up or down by whole pulses as necessary to ensure that the sum of the intervals estimated by the IAR process equals the unallocated usage that is being distributed over those missing intervals.

To further ensure data integrity and reliability, the exemplary interval VEE module includes logic to determine whether it can calculate an Interval Adjusted Register (IAR) read (i.e., a re-estimation of a prior ADU-estimated daily read) without causing a sum check exception. This is a rare occurrence that results when the usage indicated by a partial set of interval reads between two good daily (register) reads exceeds the difference between those two register reads, and indicates there is a mis-match between the register reads and interval reads for a meter. If the register read cannot be re-calculated without causing a sum check exception, then the exemplary embodiment does not replace any prior estimated register reads with an estimate based on good or estimated interval read data. In other words, it leaves the prior estimate in place. (Note: sum check and sum check exception are sometimes used interchangeably herein and in the industry, where what is meant in the context is sum check exception.)

For example, if there is a good Day 0 register (check or anchor) read of 100 kWh on a meter with hourly intervals, 23 Day 1 good intervals with 17 kWh of usage, one Day 1 missing interval with 1 kWh of usage, and a Day 1 WAVE-estimated register read of 118 (based on past ADU data), followed by 24 Day 2 good intervals with 6 kWh of usage, and a Day 2 good register (check or anchor) read of 120 kWh, the IAR process (sum check reducer module) determines register (check) usage of 20 kWh versus 23 kWh (17 plus 6) of good interval usage. Since this means there is a valid sum check, the exemplary interval VEE module does not attempt to calculate a Day 1 Interval Adjusted Register (IAR) read even though there are 24 good Day 2 intervals on Day 2. The exemplary embodiment leaves the Day 1 register read as an estimated 118 kWh, undoes (backs out) the 1 Day 1 estimated interval, and flags both Day 1 and Day 2 with sum check exceptions. This is a valid exception that should be investigated by the utility, since the interval reads and the register reads are actually in conflict. This same logic also applies if the usage for any combination of good intervals between two good register reads exceeds the difference between the two register reads.

The sum check reducer module, in essence, calculates the register read usage (the difference between the two good register reads bounding the time period being "IARed") and the total good interval usage (the sum of the good intervals during the time period being "IARed"), yielding the total unallocated usage for the time period. Then it determines how to best allocate that unaccounted-for usage across the missing intervals, and then derives the missing register reads from the good and estimated interval data.

To support this process, the exemplary embodiment of the interval VEE module includes two additional parameters, which serve the same functions as their similarly named WAVE counterparts:

Current good read (CGR) threshold (acronym— CGR_THRESHOLD)—"The maximum number of days that are allowed to be estimated in a given billing period in order to use the IAR-ing process which estimates usage between two good reads." The default value is "33".

Daily reads decimal point (acronym—CUM_READS_DECIMAL_PRECISION)—"The maximum number of decimal points that are allowed to be adjusted while estimating the daily register reads." This parameter must match the equivalent WAVE parameter. The default value is "3".

When estimating missing intervals for CPP (critical peak pricing) customers during a CPP event, Interval Adjusted Register (IAR) reads are treated as good register reads. Following are two examples of how this works:

If all of the missing intervals in the period that is being "IARed" between two good reads are CPP event intervals, then the sum check reducer estimates those intervals to determine IAR estimated register reads. The reason for this is that the unallocated usage clearly belongs to the missing CPP event intervals; there are no missing non-CPP events to which the usage could be allocated. Unlike the estimation of non-CCP event intervals, however, the usage for these CPP event intervals then is distributed as evenly as possible across the missing CPP event intervals, given current CPP rules. This occurs both on a single CPP event day and on multiple CPP event days if they fall within a period being "IARed".

If the missing intervals during a period between two good reads that is being "IARed" includes both missing CPP-event intervals and missing non-CPP event intervals, then the IAR logic distributes unallocated usage equally across all missing intervals for the purpose of calculating estimated Interval Adjusted Register (IAR) reads. The reason for this is that these estimated IAR reads are believed to be better than the existing WAVE-estimated register reads because they factor in all available interval usage. Then the existing CPP rules are applied: the missing CPP-event intervals are set to zeroes (and "Missing") and all of the unallocated usage is distributed across just the missing non-CPP-event intervals using reference shape (load profile) data if available.

Block 280 entails determining any missing time-of-use (TOU) reads using the modified set of meter read data (i.e., the completed set of interval reads and daily reads). In the exemplary embodiment, this process uses interval and register reads to estimate missing TOU reads. It can also discard existing TOU reads if the sum of the TOU reads does not match the day's total usage. If the estimated TOU reads are based only on good intervals during the framed TOU period, then, at the utility's option, the exemplary embodiment flags or labels estimated TOU reads "FG" (Framed Good); otherwise, estimated TOU reads are labeled as "FE" (Framed Estimated). In addition, if the percentage of good intervals exceeds a configurable percentage, for example 80%, the estimated TOU reads can also be flagged or labeled "FG" (Framed Good) instead of "FE" (Framed Estimated).

In addition to determining missing TOU reads, the exemplary embodiment, discards and re-estimates good Time of Use (TOU) reads when the good TOU reads do not match the total usage indicated by the day's register reads for a given day. These replacement TOU reads are also labeled "FG" (Framed Good) and "FE" (Framed Estimated). In the exemplary embodiment, TOU periods (or bins) are configurable and can vary by daytype and season. For example, a winter weekday can be divided into two bins, bin 1 and bin 2. TOU bin 1 includes: usage from midnight to 6:00 am; usage from 12 noon to 6:00 pm; and usage from 10:00 pm to midnight. TOU bin 2 includes usage from 6:00 am to 12 noon and usage from 6:00 pm to 10:00 pm. In a four-bin example, TOU Bin 1 includes: usage from midnight to 8:00 am; TOU Bin 2 includes usage from 8:00 am to 10:00 am and usage from 10:00 pm to midnight; TOU Bin 3 includes usage from 10:00 am to 2:00 pm and usage from 8:00 pm to 10:00 pm; and TOU Bin 4 includes usage from 2:00 pm to 8:00 pm.

After determining the TOU reads, exemplary execution continues at block 290.

Block 290 entails determining any missing demand reads using the completed set of interval reads (which includes one or more estimated interval reads.) Demand readings indicate the peak demand for electricity in a given day, and can be calculated using conventional techniques using the maximum usage noted for an hourly interval for a given day. Any missing demand reads determined from the completed set of interval read data for a given data are labeled with an estimate label in some embodiments. Execution continues at block 299.

Figure 3:
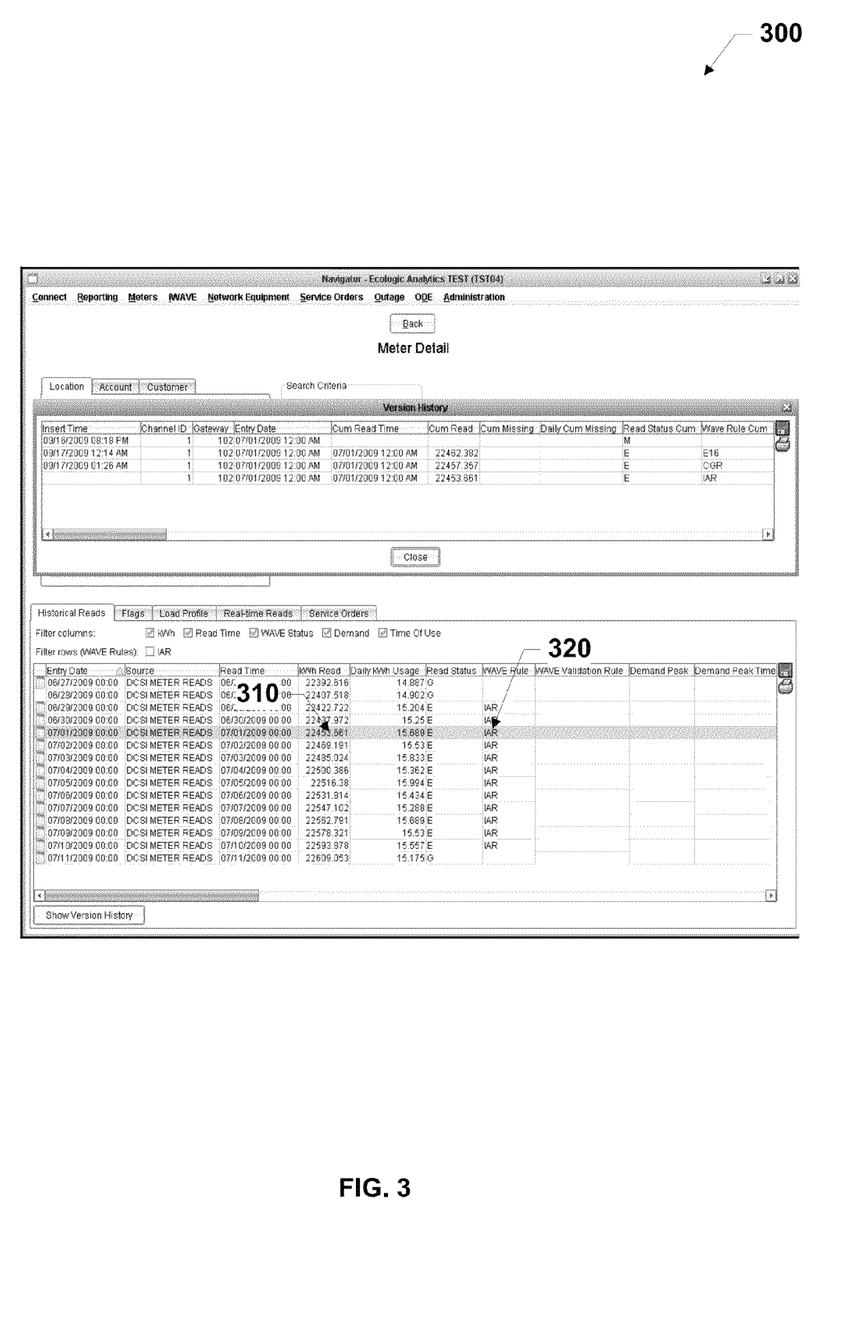
FIG. 3 is a facsimile of an exemplary graphical user interface for daily meter read data version history, which corresponds to one or more embodiments of the present invention.

Block 299 entails presenting the meter read data to a user via an access device, such as access device 130 in FIG. 1. In the exemplary embodiment, this entails displaying a graphical user interface, such as interface 300 in FIG. 3, which includes, among other information, a daily meter read value and usage 310 in association with an estimation rule indicator 320. In the exemplary embodiment, estimation rule indicator 320 indicates that the daily meter data value was estimated using interval data via a label IAR.

Figure 4:
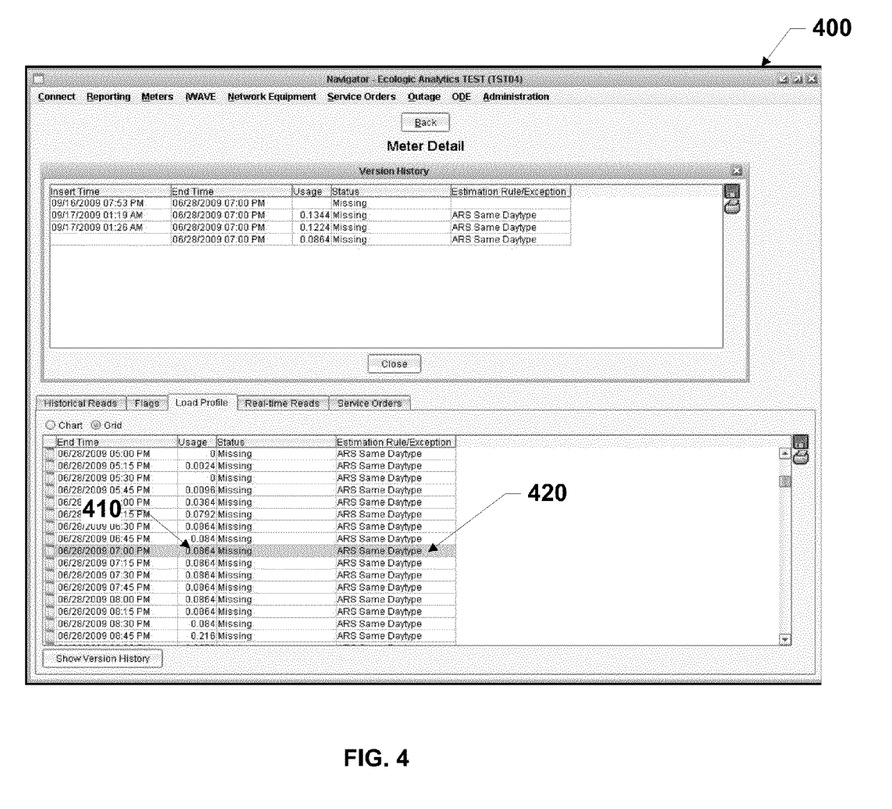
FIG. 4 is a facsimile of an exemplary graphical user interface for interval meter read data version history, which corresponds to one or more embodiments of the present invention.

FIG. 4 shows an interface 400, which displays interval meter read value 410 in association with an estimation rule indicator 420. In this embodiment, indicator 420 takes the form of the label "ARS Same Daytype" indicating that the given interval value was based on the Auto Reference Shape (ARS) Same Daytype estimation rule. (As described above, the exemplary embodiment provides four possible ARS estimation rules and corresponding labels, and one flat line estimation rule and corresponding label this estimation rule corresponds to the SDY estimation rule described above.)

Other Exemplary Operational Scenarios

Described below are ten operational scenarios addressed by some embodiments of the sum check reducer module.

Scenario 1. One Missing End Register Read with 24 Good Intervals for that Day

If a good register read is received for Day 0 and no register read is received for Day 1 but 24 good interval reads are received for Day 1, the EMED Missing process continues to identify the Day 1 register read as missing, the WAVE module continues to estimate the missing register read based on past register reads, and the LP Sync process continues to copy the good beginning (Day 0) register read and the WAVE-estimated ending (Day 1) register read to the LP Header table. At this point, without IAR there is most likely be a sum check for Day 1 because the WAVE-estimated ending (Day 1) register read does not take into account the 24 good interval reads.

However, when iWAVE recognizes the WAVE-estimated ending (Day 1) register read along with the 24 good interval reads for Day 1, iWAVE (interval VEE module) calculates the ending (Day 1) register read value based on the good intervals, replaces the WAVE-estimated ending (Day 1) register read with this calculated Interval Adjusted Read (IAR), sets the status for this Interval Adjusted Register (IAR) read to Good ("G"), and sets the WAVE Rule to Interval Adjusted Read (IAR). This Interval Adjusted Register (IAR) read is not replaced by any subsequent processing. Thus, there is now no sum check exception for Day 1. (Some embodiments allow a good IAR read to be replaced by a subsequent good recovery read; however, this may engender affects on other portions of the MDMS that need to be considered.)

If a good register read is received for Day 2, the LP Sync process now copies the beginning JAR (Day 1) register read and the good ending (Day 2) register read to the LP Header table, iWAVE validates the 24 good intervals for Day 2, and there is no sum check exception for Day 2.

Scenario 2. One Missing End Register Read with Missing Intervals for that Day, Followed by 24 Good Intervals and a Good End Register Read on the Following Day If a good register read is received for Day 0, no register read is received for Day 1, and some or all of the interval reads are missing for Day 1, the EMED Missing process continues to identify the Day 1 register read and the missing intervals as missing, WAVE continues to estimate the missing register read based on past register reads, the LP Sync process continues to copy the good beginning (Day 0) register read and the WAVE-estimated ending (Day 1) register read to the LP Header table, and iWAVE continues to estimate the missing Day 1 intervals using the good beginning (Day 0) register read and the WAVE-estimated end (Day 1) register read. At this point, there is no sum check for Day 1.

If 24 good interval reads and a good register read are received for Day 2, WAVE no longer uses the CGR process (using past register read history) to re-estimate the Day 1 register read using the Day 0 and Day 2 good register reads and the LP Sync process copies the WAVE-estimated beginning (Day 1) register read and the good ending (Day 2) register read to the LP Header table. At this point, without JAR there likely is no sum check exception for Day 1 but a sum check exception is likely for Day 2.

When iWAVE recognizes the WAVE-estimated beginning (Day 1) register read along with the 24 good intervals for Day 2, iWAVE calculates the beginning (Day 1) register read value based on the 24 good intervals for Day 2, replaces the estimated beginning (Day 1) register read with this calculated Interval Adjusted Read (JAR), sets the status for this register read to Estimated ("E"), sets the WAVE Rule for this register read to Interval Adjusted Read (IAR), validates the 24 good intervals for Day 2, and re-estimates the missing intervals for Day 1 based on the new IAR ending (Day 1) register read. This Interval Adjusted Register (IAR) read is replaced by any subsequent good recovery register reads. Thus, there is no sum check exception for Day 1 or Day 2.

Scenario 3. Two Consecutive Missing End Register Reads with Missing Intervals for Those Days, Followed by 24 Good Intervals and a Good End Register Read on the Third Day If a good register read is received for Day 0, no register read is received for Day 1, and some or all of the interval reads are missing for Day 1, the EMED Missing process continues to identify the Day 1 register read and the missing intervals as missing, WAVE continues to estimate the missing (Day 1) register read based on past register reads, the LP Sync process continues to copy the good beginning (Day 0) register read and the WAVE-estimated ending (Day 1) register read to the LP Header table, and iWAVE continues to estimate the missing Day 1 intervals using the good beginning (Day 0) register read and the WAVE-estimated ending (Day 1) register read. At this point, there is no sum check exception for Day 1.

If no good register read is received for Day 2 and some or all of the intervals are missing for Day 2, the EMED Missing process continues to identify the Day 2 register read and the missing intervals as missing, WAVE continues to estimate the missing (Day 2) register read using past register read usage, the LP Sync process continues to copy the WAVE-estimated beginning (Day 1) register read and the WAVE-estimated (Day 2) ending register read to the LP Header table, and iWAVE continues to estimate the missing Day 2 intervals using the WAVE-estimated beginning (Day 1) register read and the WAVE-estimated ending (Day 2) register read. At this point, there is no sum check exception for Day 2.

If 24 good interval reads and a good register read are received for Day 3, WAVE is no longer uses the CGR process (using past register read history) to re-estimate the Day 1 and Day 2 register reads using the Day 0 and Day 3 good register reads, and the LP Sync process copies the WAVE-estimated beginning (Day 2) register read and the good ending (Day 3) register read to the LP Header table. At this point, without IAR there are likely to be no sum check exceptions for Day 1 or Day 2, but a sum check exception is likely for Day 3.

When iWAVE recognizes the WAVE-estimated beginning (Day 2) register read along with the 24 good intervals for Day 3, iWAVE recalculates the beginning (Day 2) register read value based on the 24 good intervals for Day 3, replaces the estimated beginning (Day 2) register read with this calculated Interval Adjusted Read (IAR), sets the status for this register read to Estimated ("E"), sets the WAVE Rule for this register read to Interval Adjusted Read (IAR), and validates the 24 good intervals for Day 3, and there is no longer a sum check exception for Day 3. This JAR read is replaced by any subsequent good recovery register reads.

At this point iWAVE is usually unable to apportion unallocated usage to missing interval reads based on the estimated register reading(s) and those readings usually requires adjustment forward or backward based on the available interval data.

Therefore, the IAR process in iWAVE re-estimates the Day 1 register read using the Day 0 good register read and the Day 2 Interval Adjusted Register (IAR) read while factoring in the existing good interval reads for Day 1 and Day 2, as described below. iWAVE obtains the appropriate load profile for that customer for that day. If a load profile is available, it processes the missing intervals and register reads as described in "Calculate IAR Using Load Profile Data" below.

If no load profile (reference shape) data is available and the "Interval Flat Line Estimation" parameter is set to "0", the IAR process is not used and no further estimation or validation is performed.

If no load profile data is available, iWAVE uses the flat-line method described below to calculate the Day 1 Interval Adjusted Register (IAR) read. (This IAR flat-line method should not be confused with iWAVE's existing auto straight-line estimation, also known as point-to-point linear interpolation.)

Calculate IAR Using Flat-Line Method

This method derives the missing register read by apportioning the unallocated usage for Days 1 and 2 equally across all missing intervals for the two days, as follows:

Calculate the total usage for Days 1 and 2 as equal to the IAR Day 2 register read minus the Good Day 0 register read.

Calculate the good interval usage for Days 1 and 2 as equal to the Day 1 good interval usage plus the Day 2 good interval usage.

Calculate the unallocated usage for the missing intervals for Day 1 and Day 2 as equal to the total usage minus the good interval usage.

Calculate the unallocated usage per missing interval for the missing intervals for Day 1 and Day 2 as equal to the unallocated usage calculated above divided by (the number of Day 1 missing intervals plus the number of Day 2 missing intervals). Estimate each missing interval using this amount, flag the interval's status as Estimated and set the Estimation Rule for each interval to Flat Line (IFL).

Calculate the Day 1 Interval Adjusted Register (IAR) read as equal to the Day 0 register read plus the Day 1 good interval usage plus (the number of Day 1 missing intervals times the unallocated usage per missing interval. Or, alternately, yielding the same result, calculate the Day 1 Interval Adjusted Register (IAR) read as equal to the Day 2 Interval Adjusted Register (IAR) read minus the Day 2 good interval usage minus (the number of Day 2 missing intervals times the unallocated missing usage per missing interval). The status for this Day 1 Interval Adjusted Register (IAR) read is set to Estimated ("E"), the WAVE Rule for this register read is set to Interval Adjusted Read (IAR), the Day 1 and Day 2 intervals are validated, and there are no longer sum check exceptions for Day 1 or Day 2

Calculate IAR Using Load Profile Data

If load profile data is available, iWAVE uses that load profile data to apportion the unallocated usage for Days 1 and 2 proportionately across the missing intervals for those two days:

Calculate the total usage for Days 1 and 2 as equal to the IAR Day 2 register read minus the Good Day 0 register read.

Calculate the good interval usage for Days 1 and 2 as equal to the Day 1 good interval usage plus the Day 2 good interval usage.

Calculate the unallocated usage for the missing intervals for Day 1 and Day 2 as equal to the total usage minus the good interval usage.

Obtain load profile (reference shape) data for the missing intervals and add up the projected usage for those missing intervals based on that load profile data.

Calculate the difference between the unallocated usage and the projected usage.

Divide this difference by the projected usage to determine the percentage adjustment needed to align the load profile data with the unallocated usage.

Stated another way, this adjusts the auto reference shape up or down to match the usage that needs to be allocated to the missing intervals.

Adjust the load profile (reference shape) data for each missing interval by this percentage adjustment. (This is done even for intervals previously estimated by iWAVE using existing auto straight-line estimation because the number of consecutive missing intervals was less than or equal to the "Auto Point-to-Point Linear Interpolation Threshold in Hours" parameter.)

Flag each interval's status as Estimated and set the Estimation Rule for each interval to Auto Reference Shape (ARS).

Then calculate the IAR Day 1 register read by adding the Good Day 0 register read and the good and estimated interval usage for Day 1. (This equals the IAR Day 2 register read minus the good and estimated interval usage for Day 2.)

Scenario 4. Three or More Consecutive Missing End Register Reads with Missing Intervals for Those Days, Followed by 24 Good Intervals and a Good End Register Read on a Subsequent Day If there are three or more consecutive days of missing register reads and interval reads, WAVE continues to estimate register reads based on past usage and iWAVE continues to estimate missing intervals based on these estimated register reads. At this point there are no sum check errors.

If 24 good interval reads and a good register read are received for Day x, WAVE no longer uses the CGR process (based on past register read history) to re-estimate the intervening missing register reads using the Day 0 and Day x good register reads, and the LP Sync process copies the WAVE-estimated beginning register read (Day x−1) and the good ending register read (Day x) to the LP Header table. At this point, a sum check exception is likely for Day x.

When iWAVE recognizes the WAVE-estimated beginning (Day x−1) register read along with the 24 good intervals for Day x, iWAVE calculates the beginning (Day x−1) register read value based on the 24 good intervals for Day x and iWAVE replaces the estimated beginning (Day x−1) register read with this calculated Interval Adjusted Read (IAR), sets the status for this register read to Estimated ("E"), sets the WAVE Rule for this register read to Interval Adjusted Read (IAR), and validates the 24 good intervals for Day x. There are now no sum check exception for Day x.

Then the IAR process in iWAVE re-estimates the Day 1 register read through the Day x−2 register read using the Day 0 good register read and the Day x−1 Interval Adjusted Register (IAR) read while factoring in the existing good interval reads for Day 1 through Day x−2, as described below. (The logic is similar to the same logic described for Day 1 and Day 2 in Scenario 3 above.)

iWAVE attempts to obtain the appropriate load profile for that customer for that day. If a load profile is available, it processes the missing intervals as described in "Calculate IAR Using Load Profile Data" below.

If no load profile (reference shape) data is available and the "Interval Flat Line Estimation" parameter is set to "0", the IAR process is not used and no further estimation or validation is performed.

If no load profile data is available, iWAVE uses the flat-line method described below to calculate the Day 1 Interval Adjusted Register (IAR) read. (This IAR flat-line method should not be confused with iWAVE's existing auto straight-line estimation, also known as point-to-point linear interpolation.)

Calculate IAR Using Flat-Line Method

If there is no load profile data for Day 1 through Day x−2, the missing register reads is derived by apportioning the unallocated usage for Day 1 through Day x−2 equally across all missing intervals, as described in "Calculate IAR Using Flat-Line Method" in Scenario 3. This yields Interval Adjusted Register (IAR) reads for Day 1 through Day x−2. The status for these register reads is set to Estimated ("E"), and the WAVE Rule for these register reads is set to Interval Adjusted Read (IAR). The status of each estimated interval is set to Estimated and the Estimation Rule for each interval is set to Flat Line (IFL)

Calculate IAR Using Load Profile Data

If load profile data is available, iWAVE uses that load profile data to apportion the unallocated usage for Day 1 through Day x−2 proportionately across the missing intervals for those two days:

Calculate the total usage for Day 1 through Day x−2 as equal to the IAR Day x−2 register read minus the Good Day 0 register read.

Calculate the good interval usage for Day 1 through Day x−2 as equal to the good interval usage for Day 1 through Day x−2.

Calculate the unallocated usage for the missing intervals for Day 1 through Day x−2 as equal to the total usage minus the good interval usage.

Obtain load profile (reference shape) data for the missing intervals and add up the projected usage for those missing intervals based on that load profile data.

Calculate the difference between the unallocated usage and the projected usage.

Divide this difference by the projected usage to determine the percentage adjustment needed to align the load profile data with the unallocated usage.

Stated another way, this adjusts the auto reference shape up or down to match the usage that needs to be allocated to these missing intervals.

Adjust the load profile (reference shape) data for each missing interval by this percentage adjustment. Flag each interval's status as Estimated and set the Estimation Rule for each interval to Auto Reference Shape (ARS).

Then calculate the IAR Day 1 register read by adding the Good Day 0 register read and the good and estimated interval usage for Day 1. Calculate the IAR Day 2 register read by adding the IAR Day 1 register read and the good and estimated interval usage for Day 2. Repeat the process for each day through Day x−2. (The IAR Day x−2 register read equals the IAR Day x−1 register read minus the good and estimated interval usage for Day x−1.) Set the status for each of these Interval Adjusted Register (IAR) reads to Estimated ("E"), set the WAVE Rule for these register reads to Interval Adjusted Read (IAR), and validate the intervals for Day 1 through Day x−2. Thus, there are no sum check exceptions for Day 1 through Day x−2.

Scenario 5. One Day with a Missing End Register Read and Missing Intervals, Followed by a Second Day with a Good End Register Read and Missing Intervals This scenario is almost identical to scenario 3, except that in this scenario iWAVE already has a good Day 2 register read and can immediately begin the process of re-estimating the Day 1 register read using the Day 0 good register read and the Day 2 Interval Adjusted Register (IAR) read while factoring in the existing good interval reads for Day 1 and Day 2 using either the flat-line method or load profile data.

Scenario 6. Two or More Consecutive Missing End Register Reads with Missing Intervals for Those Days, Followed by a Good End Register Read and Missing Intervals on a Subsequent Day.

This scenario is almost identical to scenario 4 above, except that in this scenario iWAVE already has a good Day x register read and can immediately begin the process of re-estimating the Day 1 register read through the Day x−1 register read using the Day 0 good register read and the Day x good register read while factoring in the existing good interval reads for Day 1 through Day x−1 using either the flat-line method or load profile data.

Scenario 7. Two Consecutive Missing End Anchor Reads with Missing CPP-Event Intervals for Those Days (and NO Missing Non-CPP-Event Intervals), Followed by a Good End Register Read and 24 Good Intervals on the Third Day This scenario is similar to scenario 3 when no load profile data is available, because the CPP rules call for distributing the unallocated usage as evenly as possible across the missing CPP event intervals.

Scenario 8. Two Consecutive Missing End Anchor Reads with Missing CPP-Event Intervals for Those Days AND Missing Non-CPP-Event Intervals, Followed by a Good End Register Read and 24 Good Intervals on the Third Day Under the CPP rules, the CPP-event intervals are set to zeroes (and "Missing") and all of the unallocated usage is allocated entirely to the non-CPP-event intervals. Then the interval data, with all CPP-event intervals zeroed out, is used to calculate the IAR estimated register reads. As shown in Example 8, if all of the missing non-CPP-event intervals occur on one day, all of the unallocated usage is distributed there, and the IAR-estimated register read reflects this. It should be noted that, under the CPP rules, if this results in a spike check, the estimates for those non-CPP-event intervals are not applied.

Scenario 9. One Missing End Register Read with a Missing Interval for that Day, Followed by a Good End Register Read and 24 Good Intervals on the Following Day, when Estimated Interval Yields a Spike Check This scenario is similar to scenario 2, except that there is one missing interval where the distribution of unallocated usage to that interval results in a spike check. When this occurs, the IAR process does not apply the interval read estimation(s) but applies the Interval Adjusted Register (IAR) read(s), flags the LP header as "RAW", allowing a sum check exception to occur (but not a spike check exception). This result applies in any scenario where intervals estimated by the IAR process would otherwise yield a spike check.

Scenario 10. One Missing End Register Read with No Missing Intervals for that Day, Followed by a Good End Register Read and 24 Good Intervals on the Following Day, but Day 1 has a Spike Check This scenario is similar to scenario 2, except that there are no missing intervals but one interval on Day 1 yields a spike check. When this occurs, the IAR process applies the Interval Adjusted Register (IAR) read, flags the LP Header as "RAW", and allows a spike check exception to occur (but not a sum check exception). This result applies in any scenario where a spike check exception on a good interval or other interval-level exception occurs.

Exemplary Operational Assumptions

The exemplary embodiment incorporates the following assumptions:
1. References to 24 intervals assume a meter with 60-minute reading intervals. The same logic applies to meters with other interval periods, substituting, for example, "96 intervals" for "24 intervals" as appropriate when 15-minute intervals are used.
2. The IAR process is not used if an estimated register read during the period being "IARed" has already been billed and if the UPDATE BILLED READS parameter in iWAVE is set to "0" (for "No") for that meter's gateway.
3. If an Interval Adjusted Register (IAR) read would result in a Rollover Not Validated (RNV) exception, the IAR results are not applied.
4. A parameter ("Interval Flat Line Estimation": 1/0) allows the client utility to allow or prohibit use of the IAR process when load profile (reference shape) data is not available. If this parameter is set to "1" (the default), the IAR process uses a flat-line process to apportion unallocated usage equally to all missing intervals when load profile (reference shape) data is not available. If this parameter is set to "0", the IAR process is not used, and the estimated register reads remain WAVE-estimated, and interval readings are not adjusted.
5. If the usage indicated by a partial set of interval reads for a given day exceeds the total usage indicated by an IAR estimated register read, the IAR results are not applied, any estimated register reads remain WAVE-estimated, and interval readings are not adjusted. This should only occur if there are actual problems with either register read data or interval read data for a given meter.
6. If the process to adjust missing interval reads based on Interval Adjusted Register (IAR) reads results in a header-level exception (sum check or rollover), then the iWAVE module rolls back those interval read estimations and the Interval Adjusted Register (IAR) read(s) and a sum check exception result. This should be a rare occurrence.
7. If an interval-level exception, including a spike check, occurs during the interval adjustment process, the interval read estimations and the Interval Adjusted Register (IAR) reads are applied but the LP headers containing these exceptions are flagged as "RAW" and the exceptions are reported on the iWAVE screens (user interfaces) in AMR Navigator. If the spike check was the result of the IAR process distributing unallocated usage to that interval, then that estimated interval and any other interval read estimations are rolled back but the Interval Adjusted Register (IAR) reads are retained, the LP header containing the spike check are flagged as "RAW", resulting in a sum check exception and report of the exception on the iWAVE screens in AMR Navigator.
8. When interval reads are stored in pulses rather than kWh and IAR is calculated using the flat-line method, individual estimated intervals may be adjusted up or down by a whole pulse if the new "Adjust Estimation Flag" parameter is set to "1" in order to apportion unallocated usage without triggering a sum check exception unnecessarily. When interval reads are stored in pulses and IAR is calculated using load profile data, estimated intervals are rounded to whole pulses, and individual estimated intervals may be adjusted up or down by a whole pulse if the new "Adjust Estimation Flag" parameter is set to "1" in order to apportion unallocated usage without triggering a sum check exception. For example, if there are 8 missing intervals and the unallocated usage is 27 pulses, 5 intervals are estimated at 3 pulses and 3 intervals are estimated at 4 pulses.

Currently, if the client utility uses the iWAVE Detail screen to manually estimate (or re-estimate) and visually verify missing intervals based on a WAVE-estimated register read, the LP header for that day is flagged as VFD and the estimated intervals are flagged as "Manually Estimated" (Estimation Rule "MAN"). If a subsequent good register read is received, WAVE currently calculates a CGR register read and iWAVE then re-estimates the user-estimated interval reads based on the CGR register read, sets the LP header to VDD, and flags the re-estimated intervals as "Auto Straight Line" (Estimation Rule "ASL") or "Auto Reference Shape" (Estimation Rule "ARS"). With this enhancement, there is a similar result. If iWAVE replaces a WAVE-estimated register read with an Interval Adjusted Register (IAR) read, then iWAVE also re-estimates any user-estimated interval reads as part of calculating the new Interval Adjusted Register (IAR) read, sets the LP header to VDD, and flags the re-estimated intervals as "Flat Line" (Estimation Rule "IFL" or "Auto Reference Shape" (Estimation Rule "ARS").

This same logic applies to any missing intervals that have been approved and visually verified without change. (In this case, the LP header was also flagged as VFD but the intervals were flagged as "Approved Data" (Exception Rule "APV") (intervals that have been visually verified without change in spite of exceptions).

If the client utility uses the iWAVE Detail screen to manually modify and visually verify good intervals in an attempt to balance interval usage against register read usage based on a WAVE-estimated register read, the LP header for that day is flagged as VFD and the user-adjusted good intervals are flagged as "Manually Estimated" (Estimation Rule "MAN"). With this iARegister™ Reads enhancement, iWAVE uses any manually adjusted good intervals to calculate an IAR "Estimated" register read. Those manually adjusted good intervals do not remain flagged as "Manually Estimated" and any previous estimates for missing intervals on that day (whether automatic or manual) are removed (along with associated Exception Rules such as "ASL", "ARS", or "MAN"). This could yield an erroneous iARegister read or a sum check exception.

Similarly, if iWAVE calculates an IAR "Estimated" register read based on 24 good intervals and there are manually estimated good intervals on the previous day, the manually adjusted good interval values for the previous day remain but are no longer flagged as "Manually Estimated", any previous estimates for missing intervals on that adjacent day (whether automatic or manual) are removed (along with associated Exception Rules such as "ASL", "ARS", or "MAN"), and the manually adjusted good intervals are used to calculate the iARegister read. This yields an erroneous iARegister read but no sum check exception.

To avoid these rare occurrences, the client utility should not manually adjust good interval data based on a WAVE-estimated register read.

Exemplary Handling of Data Anomalies

When certain combinations of anomalous data occur, it is not possible for the sum check reducer module to estimate missing intervals and calculate Interval Adjusted Register (IAR) reads. When this occurs, intervals remain missing and register reads previously estimated by WAVE are not replaced. This only occurs on meters that are load-profile-enabled when the gateway for the meters is configured to use the exemplary interval adjusted register reads process. The following known situations when this could occur are listed below:

1. When no load profile (reference shape) data is available for a meter that is Load Profile Enabled (LOAD_PRO-FILE_IND is set to "Y") and the gateway for that meter is configured to not perform flat line estimation (Interval Flat Line Estimation is set to "0").

2. When a meter's scaling constant has changed during a period of estimated register reads that is being "IARed" between two good register reads. This can occur when the client utility's Customer Information System provides (via the DSE CIS DBMaint/DBSync Process—Interface 60d/e) an incorrect scaling constant at the time of installation and there are missing register reads following the initial register read.

3. When the client utility's Customer Information System provides a register configuration code that does not match the meter reading data being received by MDMS from the meter reading provider. This can occur if the Customer Information System reports (via the DSE CIS DBMaint/DBSync Process—Interface 60d/e) a meter as configured for register reads only but the meter reading provider has the meter configured for interval reads. It can also occur when the interval length reported by the Customer Information System differs from the interval length reported by the meter reading provider.

4. When a virtual meter exchange has occurred during a period of estimated register reads that is being "IARed" between two good register reads.

Exemplary Benefits

The exemplary embodiment provides one or more of the following benefits:

1. No instances of sum check errors caused by WAVE-estimated register reads based on past register reads without regard for good interval data unless some condition prevented use of the IAR process. Un-estimated or missing intervals can now be estimated, using load profile (reference shape) data or flat-line estimation.

2. No instances where iWAVE failed to estimate missing intervals due to a lack of load profile data, and no associated sum check exceptions. (NOTE: If the new "Interval Flat Line Estimation" parameter is set to "0", these exceptions are not corrected.)

3. No instances of iWAVE-estimated interval reads based on WAVE-estimated register reads based on past register reads without regard for good interval data.

4. Sum check errors or exceptions are limited to instances where missing intervals cannot be estimated by the iWAVE module, missing register reads could not be estimated either by WAVE or iWAVE's IAR logic, good interval data does not match good register read data, or (possibly) good interval data does not match usage indicated by a good register read and an IAR read. In other words, sum checks should result only from a complete inability to estimate or from interval data that is out of sync with register reads.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A meter data management system comprising:
a processor operable for receiving and storing daily and interval meter read data, with the received daily or interval meter read data having missing daily or interval read data;

a processor operable for processing the received daily and interval meter read data; and a processor operable for reducing occurrences of sum check exceptions in the processed daily meter read data;

wherein the sum check comprises a match between usage values calculated using the daily meter read data and usage values calculated using the interval meter read data; and wherein the processor operable for reducing occurrences of sum check exceptions includes a processor operable for estimating missing interval read data by reallocating unaccounted-for usage that would result in a sum check exception across the missing interval read data.

2. The system of claim 1, wherein the unaccounted-for usage is reallocated equally across the missing intervals.

3. The system of claim 1, wherein the unaccounted-for usage is reallocated proportionately across the missing intervals, based on load profile data.

4. The system of claim 1:
wherein the processor operable for processing the received daily and interval meter read data includes a processor for estimating missing daily meter values based on average daily usage; and
wherein the processor operable for reducing sum check exceptions includes a processor operable for re-estimating at least one estimated missing daily meter value, based on interval meter read data.

5. The system of claim 1, further including a processor operable for maintaining a version history of the daily and interval meter read data, wherein one or more daily and interval meter read data values are labeled to indicate that it was estimated based on interval meter read information.

6. The system of claim 5, further including a graphical user interface for enabling user access to the version history.

7. The system of claim 1, further including a processor operable for determining missing time-of-use (TOU) meter read data based on estimates of missing interval data.

8. The system of claim 1, further including a processor operable for determining missing demand meter read data based on estimates of missing interval data.

9. A process comprising:
using a computer processor for receiving and storing daily and interval meter read data, with the received daily or interval meter read data having missing daily or interval read data;
using the computer processor for processing the received daily and interval meter read data; and
using the computer processor for reducing occurrences of sum check exceptions in the processed daily meter read data;
wherein the sum check comprises a match between usage values calculated using the daily meter read data and usage values calculated using the interval meter read data; and
wherein reducing the occurrences of sum check exceptions includes using a processor for estimating missing interval read data by reallocating unaccounted-for usage that would result in a sum check exception across the missing interval read data.

10. The process of claim 9, wherein the unaccounted-for usage is reallocated equally across the missing intervals.

11. The process of claim 9, wherein the unaccounted-for usage is reallocated proportionately across the missing intervals, based on load profile data.

12. The process of claim 9:
wherein the processing the received daily and interval meter read data includes using a processor for estimating missing daily meter values based on average daily usage; and
wherein the reducing sum check exceptions includes using a processor for re-estimating at least one estimated missing daily meter value, based on interval meter read data.

13. The process of claim 9, further including using a computer processor for maintaining a version history of the daily and interval meter read data, wherein one or more daily and interval meter read data values are labeled to indicate that it was estimated based on interval meter read information.

14. The process of claim 13, further including using a graphical user interface for enabling user access to the version history.

15. The process of claim 9, further including using a processor for determining missing time-of-use (TOU) meter read data based on estimates of missing interval data.

16. The process of claim 9, further including using a processor for determining missing demand meter read data based on estimates of missing interval data.

17. A non-transitory computer readable medium comprising instructions that when executed by a processor executes a process comprising:
receiving and storing daily and interval meter read data, with the received daily or interval meter read data having missing daily or interval read data;
processing the received daily and interval meter read data; and
reducing occurrences of sum check exceptions in the processed daily meter read data;
wherein the sum check comprises a match between usage values calculated using the daily meter read data and usage values calculated using the interval meter read data; and
wherein reducing the occurrences of sum check exceptions includes instructions for estimating missing interval read data by reallocating unaccounted-for usage that would result in a sum check exception across the missing interval read data.

18. The non-transitory computer readable medium of claim 17, wherein the unaccounted-for usage is reallocated equally across the missing intervals.

19. The non-transitory computer readable medium of claim 17, wherein the unaccounted-for usage is reallocated proportionately across the missing intervals, based on load profile data.

20. The non-transitory computer readable medium of claim 17,
wherein the processing the received daily and interval meter read data includes instructions for estimating missing daily meter values based on average daily usage; and
wherein the reducing sum check exceptions includes instructions for re-estimating at least one estimated missing daily meter value, based on interval meter read data.

21. The non-transitory computer readable medium of claim 17, further including instructions for maintaining a version history of the daily and interval meter read data, wherein one or more daily and interval meter read data values are labeled to indicate that it was estimated based on interval meter read information.

22. The non-transitory computer readable medium of claim 21, further including instructions for using a graphical user interface for enabling user access to the version history.

23. The non-transitory computer readable medium of claim 17, further including instructions for determining missing time-of-use (TOU) meter read data based on estimates of missing interval data.

24. The non-transitory computer readable medium of claim 17, further including instructions for determining missing demand meter read data based on estimates of missing interval data.

* * * * *